(12) United States Patent
Ide

(10) Patent No.: US 11,077,819 B2
(45) Date of Patent: Aug. 3, 2021

(54) DECORATION MEMBER AND COVER BODY FOR AIRBAG APPARATUS

(71) Applicant: NIHON PLAST CO., LTD., Shizuoka (JP)

(72) Inventor: Kyohei Ide, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 0 days.

(21) Appl. No.: 16/695,230

(22) Filed: Nov. 26, 2019

(65) Prior Publication Data

US 2020/0164824 A1    May 28, 2020

(30) Foreign Application Priority Data

Nov. 26, 2018  (JP) .............................. JP2018-220516

(51) Int. Cl.
| | |
|---|---|
| *B60R 21/2165* | (2011.01) |
| *B60R 13/00* | (2006.01) |
| *B60R 21/215* | (2011.01) |
| *B60R 21/203* | (2006.01) |

(52) U.S. Cl.
CPC ...... *B60R 21/21656* (2013.01); *B60R 13/005* (2013.01); *B60R 21/203* (2013.01); *B60R 2021/21543* (2013.01)

(58) Field of Classification Search
CPC ........ B60R 2021/21543; B60R 21/215; B60R 21/21656; B60R 13/005; B60R 13/04; F16B 21/16; F16B 21/071; F16B 21/073
See application file for complete search history.

(56) References Cited

U.S. PATENT DOCUMENTS

| | | | |
|---|---|---|---|
| 6,581,311 B1 * | 6/2003 | Davey ................... | B60R 13/005 296/214 |
| 8,905,430 B2 * | 12/2014 | Ishikawa ............... | B60R 21/215 280/728.3 |
| 9,988,000 B2 * | 6/2018 | Barros Alonso ...... | B60R 21/203 |
| 2015/0251625 A1 * | 9/2015 | Bana Castro ....... | B60R 21/2155 280/728.3 |
| 2015/0283961 A1 * | 10/2015 | Barreiro Garcia .... | B60R 21/215 40/1.5 |
| 2020/0164825 A1 * | 5/2020 | Ide ........................ | B60R 21/203 |

FOREIGN PATENT DOCUMENTS

| | | | | |
|---|---|---|---|---|
| DE | 102012011982 A1 | * | 12/2013 | ............. G09F 21/04 |
| JP | 10119683 A | * | 5/1998 | |
| JP | 2016-124384 A | | 7/2016 | |

* cited by examiner

*Primary Examiner* — Ruth Ilan
(74) *Attorney, Agent, or Firm* — Brundidge & Stanger, P.C.

(57) ABSTRACT

To provide an emblem having a high engagement force and a cover body for an airbag apparatus provided with the emblem by means of a simple configuration. Emblem body has pin. Pin has shaft section provided with rib and enlargement section formed to be enlarged on the distal end side of shaft section. Pin is inserted through an opening section formed in a cover main body section. Back plate has hole section into which pin is inserted. Back plate has elastic piece section formed at the inner edge of hole section and elastically deformable in the insertion/removal direction of pin with respect to hole section. Elastic piece section abuts against rib of shaft section.

2 Claims, 5 Drawing Sheets

DECORATION MEMBER AND COVER BODY FOR AIRBAG APPARATUS

CROSS REFERENCE TO RELATED APPLICATION

This application is entitled to the benefit of Japanese Patent Application No. 2018-220516, filed on Nov. 26, 2018, the disclosure of which including the specification, drawings and abstract is incorporated herein by reference in its entirety.

TECHNICAL FIELD

The present invention relates to a decoration member attached with a design section and a receiving section sandwiching an attached section and a cover body for an airbag apparatus provided with the decoration member.

BACKGROUND ART

In the related art, an airbag apparatus provided in a handle of a vehicle such as an automobile is used. The airbag apparatus is provided with a bag-shaped airbag, an inflator supplying gas to the airbag, and a cover body covering and storing the airbag when the airbag is folded and not deployed. When the vehicle receives an impact due to a collision or the like, the airbag is inflated by gas being supplied from the inflator to the airbag. The airbag inflation results in breaking of the cover body along a pre-provided break line, that is, a tear line and formation of a plurality of door sections. Then, each of the door sections is deployed about a hinge section, and the airbag is deployed on an occupant side and the occupant is restrained and protected as a result.

Known with regard to such a cover body for an airbag apparatus is a configuration in which an emblem body and a receiving section constitute an emblem (ornament) as a decoration member and the emblem is attached across a cover main body section. In this configuration, a plurality of cylindrical locking pins having enlarged distal ends project on the back surface side of the emblem body, elastic piece sections project at a plurality of locations such as three locations at the inner edge of the engagement hole of the receiving section engaging with the locking pins, and the enlargement section on the distal end side of the locking pin inserted through the cover main body section and pushed into the engagement hole is inserted into the engagement hole by climbing over the elastic piece section. As a result, the emblem body and the receiving section are engaged with each other (see, for example, PTL 1).

CITATION LIST

Patent Literature

PTL 1
Japanese Patent Application Laid-Open No. 2016-124384 (FIGS. 1 to 6, Pages 5 to 10)

SUMMARY OF INVENTION

Technical Problem

In the case of the above configuration, the edge section of the elastic piece section is usually in an abutting state to surround the outer peripheral section of the cylindrical part of the locking pin. In the event of tear opening of an emblem attachment section of the cover body and centrifugal force application to the engagement section of the emblem body during airbag deployment, the cylindrical part of the locking pin may be pulled to a notch section side between the elastic piece sections. Then, detailed perfection for disengagement prevention may become necessary in the form of, for example, fine adjustment of the width of the notch section or constant and tight contact between the cylindrical part of a shaft section and the elastic piece section, which results in an increase in manufacturing cost.

The present invention has been made in view of the point described above, and an object of the present invention is to provide a decoration member having a high engagement force and a cover body for an airbag apparatus provided with the decoration member by means of a simple configuration.

Solution to Problem

A decoration member according to one aspect of the present invention is a decoration member including a design section and a receiving section. The decoration member is attached by sandwiching an attached section with the design section and the receiving section. The design section includes an engagement section inserted through an opening section formed in the attached section. The engagement section has a shaft section provided with a rib and an enlargement section formed to be enlarged on a distal end side of the shaft section. The receiving section includes a hole section into which the engagement section is inserted and an abutting section formed at an inner edge of the hole section, elastically deformable in an insertion/removal direction of the engagement section with respect to the hole section, and abutting against the rib of the shaft section.

In the decoration member according to one aspect of the present invention, which is the decoration member according to one aspect of the present invention, three ribs are radially disposed in the shaft section.

In the decoration member according to one aspect of the present invention, which is the decoration member according to one aspect of the present invention, three abutting sections are formed as the abutting section and abut against the respective ribs in middle sections thereof.

A cover body for an airbag apparatus according to one aspect of the present invention is provided with an airbag which is inflated and deployed as a result of introduction of gas from a folded state. The cover body includes a cover main body section as an attached section which covers the airbag in the folded state, tear opens as a result of inflation and deployment of the airbag, and has an opening section, and the decoration member according to one aspect of the present invention.

In the cover body for an airbag apparatus according to one aspect of the present invention, which is the cover body for an airbag apparatus according to one aspect of the present invention, the shaft section is provided with three ribs in a radial shape, one of the ribs is disposed along a centrifugal force direction at a time of the tear opening of the cover main body section, and the other two ribs are disposed on both sides of the centrifugal force direction side with respect to the one rib.

Advantageous Effects of Invention

According to the decoration member according to one aspect of the present invention, the abutting section provided at the inner edge of the hole section of the receiving section is allowed to abut against the rib of the shaft section provided on the engagement section of the design section, and thus the position of the shaft section in the hole section can be effectively regulated. As a result, it is possible to suppress deviation of the shaft section and it is possible to provide the decoration member having a high engagement force by means of a simple configuration.

According to the decoration member according to one aspect of the present invention, in addition to the effect of the decoration member according to one aspect of the present invention, the position of the shaft section in the hole section can be more reliably regulated by means of abutting between the three ribs and the abutting section since the three ribs are radially disposed on the shaft section.

According to the decoration member according to one aspect of the present invention, in addition to the effect of the decoration member according to one aspect of the present invention, the middle sections of the three abutting sections abut against the three ribs. Accordingly, even when the position where the rib abuts against the abutting section is shifted due to an external force, abutting between the rib and the abutting section can be easily maintained and the decoration member can be firmly fixed to the attached section with respect to the external force.

The cover body for an airbag apparatus according to one aspect of the present invention includes the decoration member according to one aspect of the present invention. Accordingly, it is possible to effectively suppress deviation of the decoration member from the cover main body section attributable to the centrifugal force generated during tear opening of the cover main body section without using a complex and expensive configuration.

According to the cover body for an airbag apparatus according to one aspect of the present invention, in addition to the effect of the cover body for an airbag apparatus according to one aspect of the present invention, one of the three radial ribs of the shaft section is disposed along the centrifugal force direction at a time of tear opening of the cover main body section and the other two ribs are disposed on both sides on the centrifugal force direction side with respect to the one rib. Accordingly, the centrifugal force applied from the abutting section of the receiving section to the one rib during tear opening of the cover main body section can be dispersed into two from the two ribs to the abutting section of the receiving section and the decoration member can be more firmly held by the cover main body section.

BRIEF DESCRIPTION OF DRAWINGS

FIG. 1A is a cross-sectional view illustrating a state where a design section and a receiving section of a decoration member of one embodiment of the present invention are attached and FIG. 1B is a cross-sectional view in which FIG. 1A is enlarged in part;

DESCRIPTION OF EMBODIMENTS

Hereinafter, the configuration of one embodiment of the present invention will be described with reference to the drawings.

Figure 5:
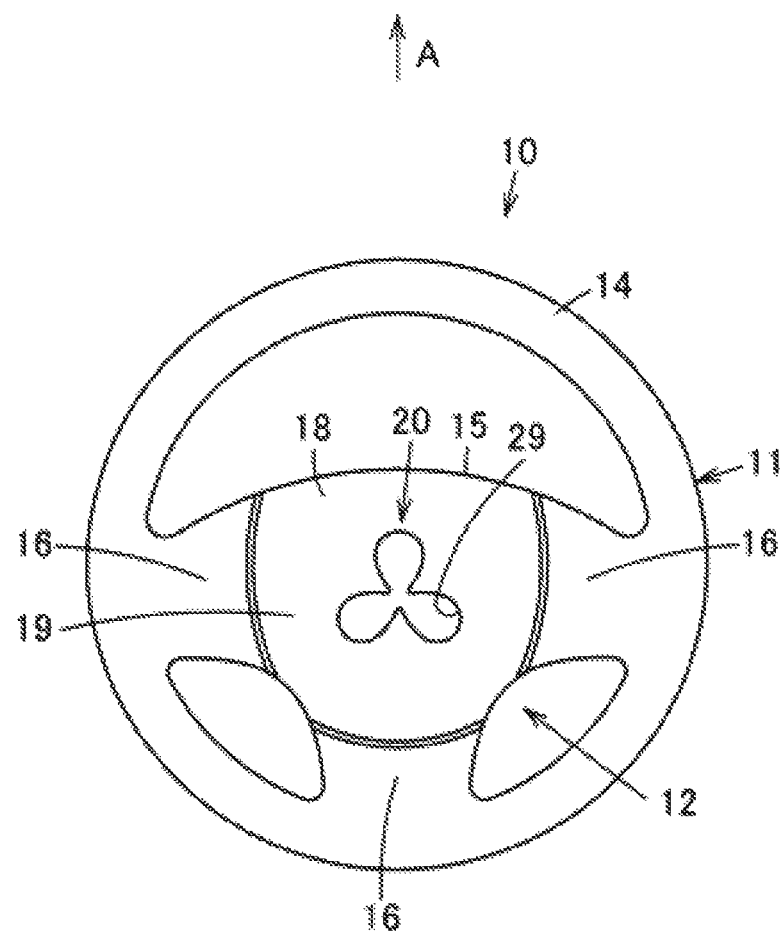
FIG. 5 is a front view illustrating an example of a handle provided with the airbag apparatus.

In FIG. 5, 10 denotes a steering wheel as a handle of an automobile as a vehicle. Steering wheel 10 is provided with steering wheel main body 11 as a handle main body and airbag apparatus 12 mounted on the occupant side of steering wheel main body 11. Steering wheel 10 is mounted on a steering shaft. Usually, the steering shaft is provided in an inclined state in the vehicle. The steering shaft side is the rear side in the following description, the occupant side is the front side in the following description, and the direction toward a windshield (arrow A direction) is the upper side in the following description with a state where the vehicle goes straight ahead used as a reference.

Rim section 14 as a grip section that is an annular grip section, boss section 15 positioned inside rim section 14, and spoke sections 16 interconnecting rim section 14 and boss section 15 constitute steering wheel main body 11.

A substantially cylindrical boss (not illustrated) fitted to the steering shaft is provided in the rear section of boss section 15 and a boss plate constituting a core body is integrally fixed to the boss. The core metal of spoke section 16 is fixed by welding or the like or integrally extended from the boss plate. The core metal of rim section 14 is fixed to the core metal of spoke section 16 by welding or the like. A skin section is formed in the outer peripheral section of the core metal of rim section 14 and the outer peripheral section of the rim section 14 side part of the core metal of spoke section 16. The outer periphery of the skin section is fully or partially covered with natural or artificial leather or the like.

Figure 4:
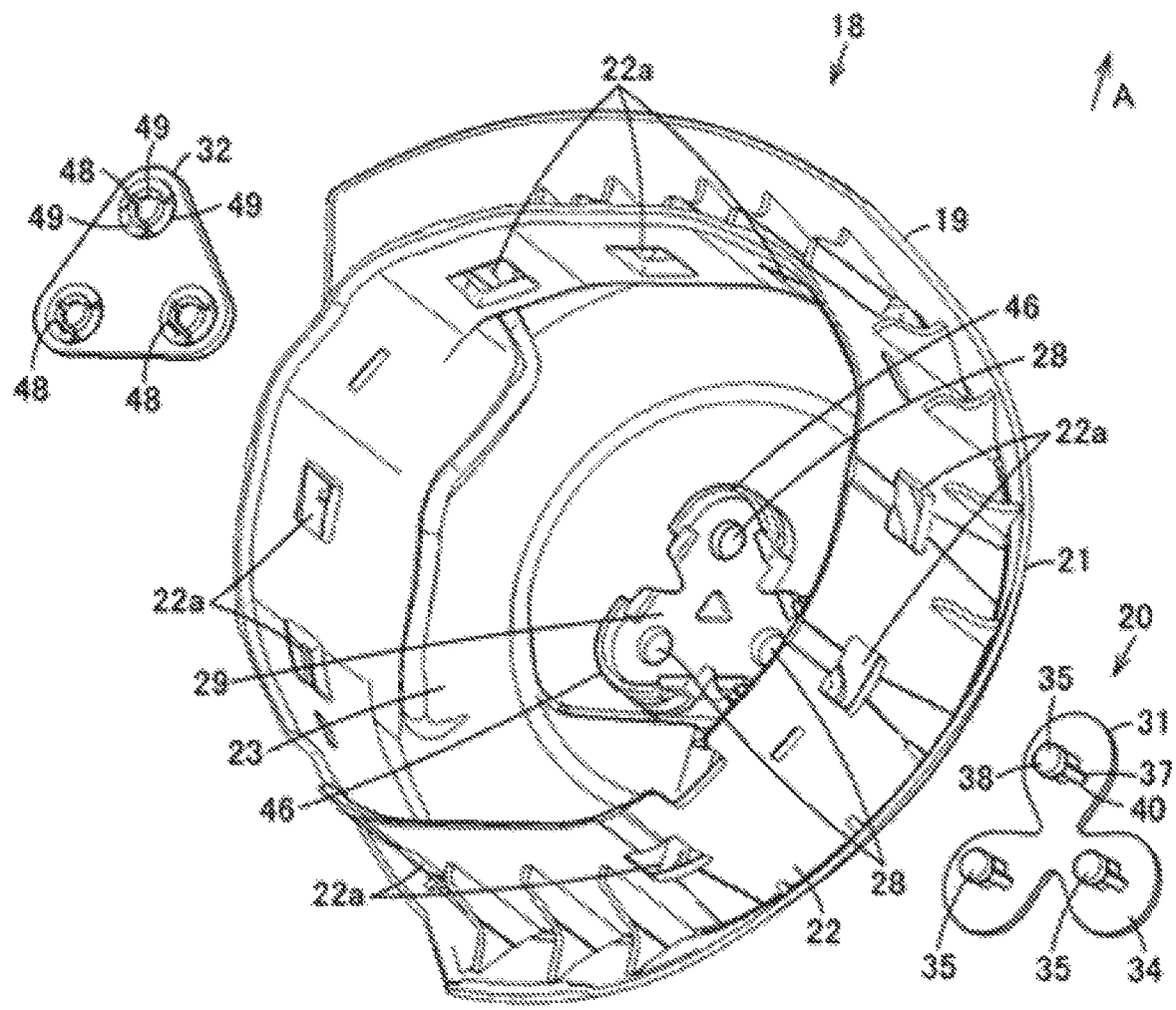
FIG. 4 is an exploded perspective view illustrating a part of a cover body for an airbag apparatus provided with the decoration member.

Airbag apparatus 12 is also called an airbag module and is disposed to cover the front side of the boss section of steering wheel main body 11. Airbag apparatus 12 is provided with a base plate as an attached member, a bag-shaped airbag, a gas-injecting inflator, and so on and is provided with cover body 18 illustrated in FIG. 4 and so on. The base plate is attached to steering wheel main body 11 via a horn plate, a bracket section, or the like. The airbag, the inflator, and cover body 18 are attached to the base plate. The folded and small airbag is covered with cover body 18.

Cover body 18 is also called a case body, a pad, a module cover, or the like. Cover body 18 is provided with cover main body section 19 that is, for example, an attached section and emblem 20 that is a decoration member attached to cover main body section 19.

Cover main body section 19 is formed of, for example, a synthetic resin. Cover main body section 19 is provided with surface plate section 21 as a covering section covering boss section 15 and spoke section 16 in part and peripheral plate section 22 as a peripheral wall projecting in a tubular shape such as a substantially square tubular shape from the rear (back surface) of surface plate section 21 when viewed from the front. The part that is surrounded by surface plate section 21 and peripheral plate section 22 is an airbag storage section where the folded airbag is stored. The part that faces the front side of the airbag storage section is front plate section 23 as a decoration member attachment section. In surface plate section 21, a tear line is formed to face the airbag storage section. Door sections are formed during airbag deployment as a result of tear opening of the tear line. This tear line can also be called a planned line section, a section planned to break, or the like, and the rear (back surface) side of front plate section 23 is recessed in a groove shape and is formed as a weak section more fragile than the other parts of front plate section 23. This tear line can be set in any manner at a position avoiding emblem 20 in accordance with the shape and the number of the door sections that are desired to be set. In the present embodiment, the tear line is formed to, for example, continue from one side section of front plate section 23 to the other side section of front plate section 23 via the lower section of emblem 20. Accordingly, the door section is deployed to pivot upward with the upper section of emblem 20 of front plate section 23 used as a hinge section. In other words, during tear opening of cover main body section 19 by the tear line, the centrifugal force that results from door section opening is in a direction perpendicularly away from the direction of pivoting of the hinge section (indicated by Arrow B). Hereinafter, in the present embodiment, the centrifugal force direction that is generated during the tear opening of cover main body section 19 will be referred to as a centrifugal force direction and the centrifugal force direction will be indicated by Arrow C in the drawings.

Opening sections 28 for attaching emblem 20 are open in surface plate section 21. Opening sections 28 are formed in a circular shape and are provided to penetrate front plate section 23 in the front-rear direction, which is a thickness direction. Opening sections 28 can be appropriately set in accordance with the shape of emblem 20 and the like insofar as emblem 20 can be fixed in a balanced manner in the up-down and left-right directions. Set in the present embodiment are, for example, opening section 28 that is positioned in the upper middle section and opening sections 28 and 28 that are positioned in both lower side sections. In the present embodiment, opening section 28 is disposed on, for example, each vertex of an equilateral triangle. In other words, opening sections 28 are disposed in rotational symmetry (three-fold symmetry). Surface plate section 21 is provided with recessed attachment recessed section 29 in the middle section on the front side as a design surface. Attachment recessed section 29 is a storage section where emblem 20 is stored. Attachment recessed section 29 is formed along, for example, the shape of emblem 20. In this case, opening section 28 is disposed in the bottom section of attachment recessed section 29.

Peripheral plate section 22 is provided with, for example, engagement opening sections 22a as cover body engagement sections for engaging the base plate and cover body 18 with each other.

Emblem 20 is also called an ornament or the like. Emblem 20 is provided with emblem body 31 as a design section and back plate 32 as a receiving section. Emblem 20 is attached with emblem body 31 and back plate 32 sandwiching front plate section 23 of cover body 18.

Emblem body 31 illustrated in FIGS. 1A, 1B, 2A to 2D, and 4 is also called a design ornament, an upper plate, an upper emblem, or the like. Emblem body 31 is molded with a hard or soft synthetic resin or the like and a surface treatment such as painting and plating is appropriately performed on emblem body 31. Emblem body 31 constitutes a design part of emblem 20. Emblem body 31 is attached to the front side, which is the side of front plate section 23 that is opposite to the airbag. In the present embodiment, emblem body 31 is fitted into attachment recessed section 29. Emblem body 31 is integrally provided with emblem main body section 34 as a design section main body section and pins 35 as engagement sections projecting to emblem main body section 34.

Emblem main body section 34 is capable of having various shapes. For example, in the present embodiment, emblem main body section 34 has a so-called clover shape in which three circular parts having the same diameter are equiangularly disposed. In other words, emblem main body section 34 is formed in rotational symmetry. Emblem main body section 34 is positioned in attachment recessed section 29 in the present embodiment. Emblem main body section 34 is formed in a plate shape.

Pins 35 are respectively inserted through opening sections 28 and engaged with back plate 32. As a result, emblem body 31 is engaged with and fixed to back plate 32 on the cover body 18 side. Pin 35 has shaft section 37 continuous with emblem main body section 34 and enlargement section 38 enlarged in a step shape on the distal end side of shaft section 37. Here, the disposition of pins 35 can be appropriately set in accordance with the shape of emblem body 31 and the like insofar as emblem body 31 can be supported in a balanced manner in the up-down and left-right directions. For example, in the present embodiment, pins 35 are respectively disposed in the middle or substantially middle sections of the three parts of emblem main body section 34. Accordingly, in the present embodiment, pin 35 is disposed on each vertex of an equilateral triangle and in rotational symmetry when viewed from the front.

Shaft section 37 is provided with ribs 40. In the present embodiment, ribs 40 constitute shaft section 37. For example, three ribs 40 are formed and radially disposed. In other words, ribs 40 extend along a radial direction from the central axis positions of pins 35. Ribs 40 of the present embodiment are equally disposed in a Y shape when viewed from the distal end sides of pins 35. One first rib 40a and two second ribs 40b are set in ribs 40. First rib 40a is positioned on a side close to the hinge section of the door section and is formed along the centrifugal force direction. Second ribs 40b are positioned on a side far from the hinge section of the door section and are disposed on both sides on the centrifugal force direction side with respect to first rib 40a. In the present embodiment, first rib 40a is formed along the up-down direction when viewed in the front-rear direction, which is the insertion/removal direction of pin 35, and positioned above second ribs 40b and 40b and second ribs 40b and 40b are formed along the left-right diagonal direction and respectively positioned below first rib 40a.

Enlargement section 38 is enlarged in a direction intersecting with the protrusion direction of pin 35 with respect to shaft section 37. Enlargement section 38 is formed in, for example, a columnar shape. Enlargement section 38 is formed continuously with rib 40 of shaft section 37.

Back plate 32 illustrated in FIGS. 1A, 1B, 3, and 4 is also called a lower emblem or the like. Back plate 32 is molded with, for example, a hard synthetic resin. Back plate 32 is capable of having various shapes insofar as emblem body 31 can be fixed to surface plate section 21 (front plate section 23). For example, back plate 32 is formed in the shape of an equilaterally triangular plate in which each corner section is curved in a circular arc shape. In other words, back plate 32 is formed in rotational symmetry. Back plate 32 is attached to the rear side, which is the airbag side of front plate section 23. In the present embodiment, back plate 32 is disposed on the rear side of attachment recessed section 29. Back plate 32 is positioned with the outer shape position of back plate 32 regulated by rib-shaped regulation section 46 positioned on the rear side of attachment recessed section 29. Back plate 32 has hole sections 48 into which pins 35 of emblem body 31 are respectively inserted. Hole section 48 is formed in, for example, a circular shape. Hole section 48 is disposed to correspond to the disposition of pin 35. In other words, in the present embodiment, pin 35 is disposed on, for example, each vertex of an equilateral triangle. Each hole section 48 has elastic piece section 49, which is an abutting section for locking inserted pin 35. Elastic piece section 49 is a claw section protruding from the inner edge of hole section 48 toward the central section of hole section 48. Elastic piece section 49 has a thickness direction in the insertion/removal direction (indicated by Arrow X) of pin 35 with respect to hole section 48, which is the protrusion direction of pin 35, and has a plate shape elastically deformable in the thickness direction. In the present embodiment, three elastic piece sections 49 are formed for each hole section 48 and equally spaced apart in the circumferential direction of hole section 48. Accordingly, notch section 50 as a radial groove section along the radial direction of hole section 48 is between elastic piece sections 49 and 49 that are adjacent to each other. Accordingly, in the present embodiment, three notch sections 50 are formed for each hole section 48.

Elastic piece section 49 facilitates the insertion of pin 35 into hole section 48. Elastic piece section 49 is formed in, for example, a belt shape constantly protruding along the circumferential direction from the inner edge of hole section 48. One first elastic piece section 49a and two second elastic piece sections 49b are set in elastic piece sections 49. First elastic piece section 49a is positioned on a side close to the hinge section of the door section, that is, on the side opposite to the centrifugal force direction in hole section 48. Second elastic piece sections 49b are positioned on a side far from the hinge section of the door section and on both sides on the centrifugal force direction side in hole section 48. In the present embodiment, first elastic piece section 49a is positioned above second elastic piece sections 49b and 49b when viewed in the front-rear direction, which is the insertion/removal direction of pin 35, and second elastic piece sections 49b and 49b are positioned on the left and right sides below first elastic piece section 49a. Elastic piece sections 49a, 49b, and 49b are formed in the same or substantially the same shape.

Figure 1A:
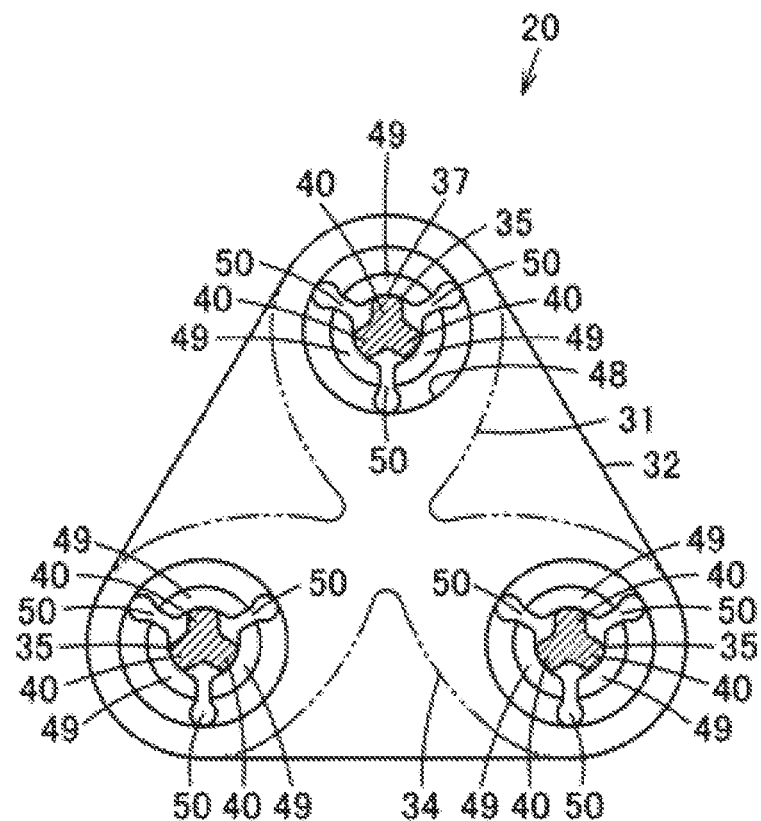

When cover body 18 is manufactured, cover main body section 19 is injection-molded with a synthetic resin in advance, and then separately molded emblem body 31 is disposed on the front side of front plate section 23 of surface plate section 21 of cover main body section 19, pin 35 is inserted through opening section 28, separately molded back plate 32 is disposed on the rear side of front plate section 23 of surface plate section 21, and pin 35 of emblem body 31 protruding from each opening section 28 is insertion-fitted (press-fitted) with respect to hole section 48 of back plate 32. As a result, respective enlargement sections 38 of pins 35 respectively and elastically deform elastic piece sections 49, elastic piece sections 49 are return-deformed at the positions where enlargement sections 38 pass through elastic piece sections 49 and come into contact with shaft section 37, and emblem body 31 is locked and held by back plate 32. As for rib 40 of each pin 35 in this state, first rib 40a comes into contact with the middle section of the distal edge of first elastic piece section 49a of hole section 48 and second ribs 40b and 40b come into contact with the middle sections of the distal edges of second elastic piece sections 49b and 49b of hole section 48 as illustrated in FIG. 1A. Each notch section 50 is positioned between ribs 40 and 40 of shaft section 37 of each pin 35. Accordingly, emblem 20 is firmly fixed in a state where front plate section 23 of surface plate section 21 is sandwiched in the front-rear direction by emblem body 31 and back plate 32. In this state, emblem 20 is disposed without significant protrusion from the surface of front plate section 23 around attachment recessed section 29 with emblem body 31 stored in attachment recessed section 29.

When, for example, an automobile collides with airbag apparatus 12 provided with cover body 18 and steering wheel 10 provided with airbag apparatus 12, gas is supplied to the airbag by a control apparatus operating the inflator. Then, the airbag undergoes a rapid inflation deployment, the pressure of the inflation deployment causes surface plate section 21 of cover main body section 19 to break at a position bypassing emblem 20 along the tear line, and the door section is formed. Then, the door section pivots about the hinge section and forms a protrusion port as an opening causing airbag bulging. Then, the airbag is deployed in front of the occupant from the protrusion port and the occupant is protected.

Figure 1B:
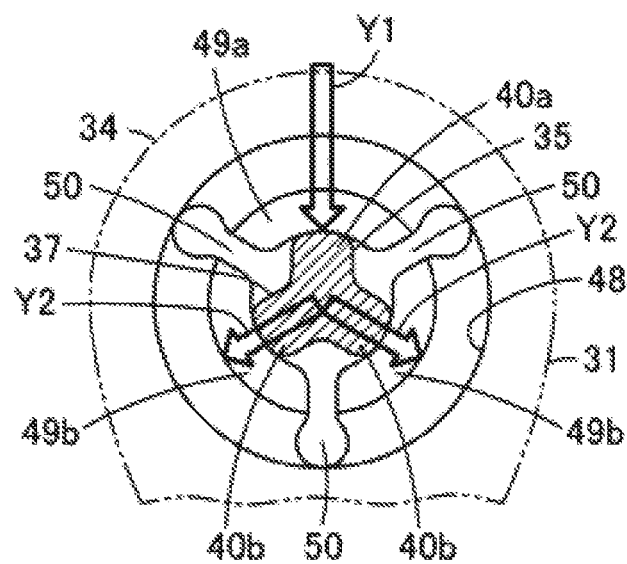
Figure 2A:
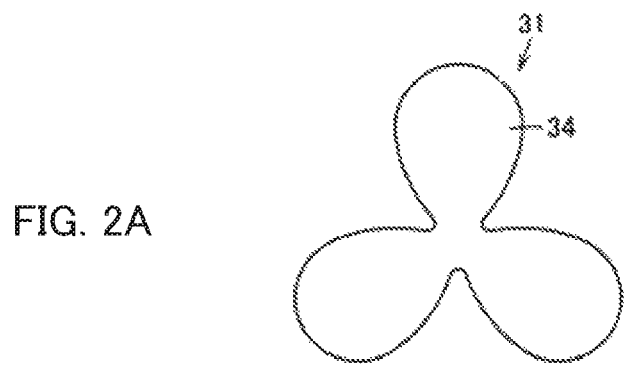
FIG. 2A is a front view illustrating the design section of the decoration member.
Figure 2B:
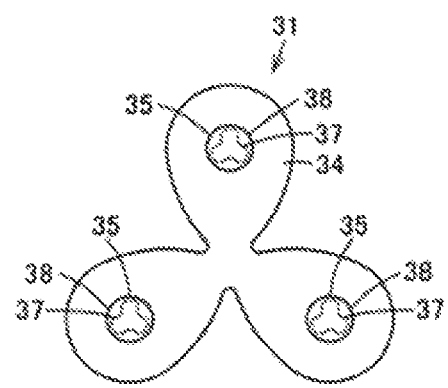
FIG. 2B is a rear view illustrating the design section.
Figure 2C:
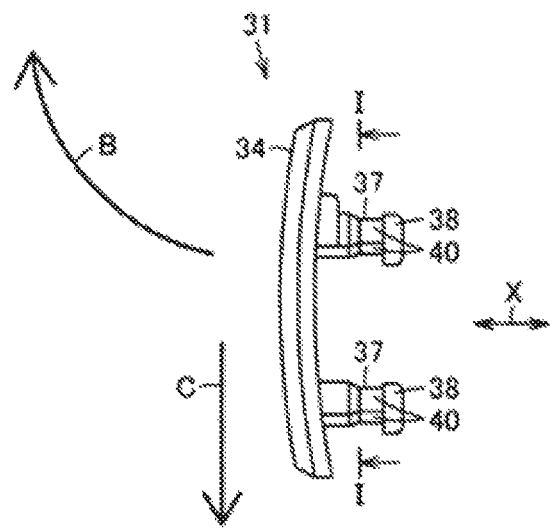
FIG. 2C is a side view illustrating the design section.
Figure 2D:
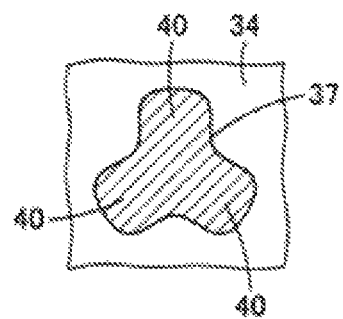
FIG. 2D is a cross-sectional view of the position corresponding to I-I FIG. 2C.
Figure 3:
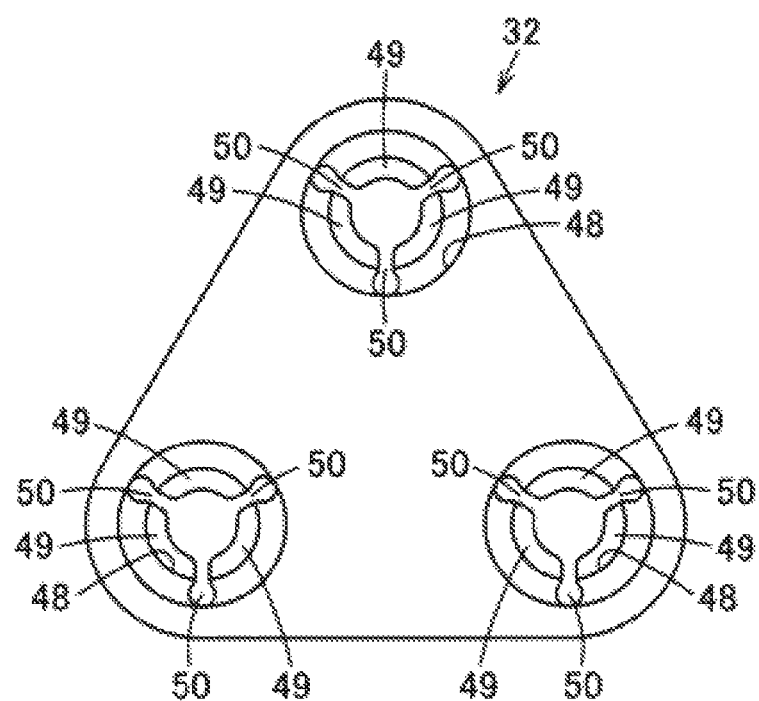
FIG. 3 is a front view illustrating the receiving section.

In emblem 20 at this time, the centrifugal force generated with the pivoting of the door section is applied to first rib 40a of pin 35 of emblem body 31 from first elastic piece section 49a of back plate 32 positioned on the side close to the hinge section of the door section (upper side in FIG. 1B) as indicated by Arrow Y1 in FIG. 1B. This centrifugal force is dispersed into two, as indicated by Arrow Y2, to second elastic piece sections 49b and 49b of back plate 32 from second ribs 40b and 40b positioned on the side far from the hinge section of the door section in pin 35 (lower side in FIG. 1B).

As described above, according to one embodiment, elastic piece section 49 provided at the inner edge of hole section 48 of back plate 32 is allowed to abut against rib 40 of shaft section 37 provided on pin 35 of emblem body 31, and thus the position of shaft section 37 in hole section 48 can be effectively regulated. As a result, it is possible to suppress deviation of shaft section 37 to notch section 50 or the like with respect to an external force such as the centrifugal force resulting from tear opening of cover main body section 19. Accordingly, emblem 20 is capable of having a high engagement force, being inexpensive, and enhancing warranty by means of a simple configuration requiring neither detailed perfection nor an increase in the number of parts.

Three ribs 40 are radially disposed on shaft section 37, and thus the position of shaft section 37 in hole section 48 can be more reliably regulated by means of abutting between three ribs 40 and elastic piece section 49. The cross-sectional area of shaft section 37 can be reduced, and thus it is possible to reduce, for example, sink marks on the design surface on the side opposite to shaft section 37 in emblem main body section 34 continuous with shaft section 37.

The middle sections of three elastic piece sections 49 abut against three ribs 40, and thus rib 40 can be brought into contact with the strongest part of elastic piece section 49. In addition, even when the position where rib 40 abuts against elastic piece section 49 is shifted due to an external force such as the centrifugal force generated during tear opening of the door section, rib 40 is unlikely to move to notch section 50, abutting between rib 40 and elastic piece section 49 can be easily maintained, and emblem 20 can be firmly fixed to cover main body section 19 with respect to an external force such as the centrifugal force.

Assembly of emblem body 31 to back plate 32 can be easily carried out simply by emblem body 31 being pushed into back plate 32 as in the related art. Accordingly, emblem 20 can be assembled without a change in the assembly facility of the related art.

Since cover body 18 of airbag apparatus 12 is provided with emblem 20, it is possible to effectively suppress deviation of emblem 20 from cover main body section 19 attributable to the centrifugal force generated during tear opening of cover main body section 19 of cover body 18 without using a complex and expensive configuration.

In particular, since one first rib 40*a* as one of three radial ribs 40 of shaft section 37 is disposed along the centrifugal force direction at a time of tear opening of cover main body section 19 and the other two second ribs 40*b* and 40*b* are disposed on both sides on the centrifugal force direction side with respect to one first rib 40*a*, the centrifugal force applied from first elastic piece section 49*a* of back plate 32 to first rib 40*a* during tear opening of cover main body section 19 can be dispersed into two from second ribs 40*b* and 40*b* to second elastic piece sections 49*b* and 49*b* of back plate 32 and emblem 20 can be more firmly held by cover main body section 19.

In one embodiment described above, emblem 20 can be implemented regardless of the number of pins 35 insofar as the molding die structure is established.

Rib 40 can be implemented with respect to cover main body section 19 regardless of the door section opening direction insofar as second ribs 40*b* and 40*b* are set on the centrifugal force direction side with respect to first rib 40*a*.

Rib 40 of pin 35 of emblem body 31 is not limited to the Y shape and, for example, four ribs 40 may be formed in a cross shape. Although elastic piece section 49 of back plate 32 can also be increased or decreased in accordance with the number of ribs 40 in this case, the numbers of ribs 40 and elastic piece sections 49 do not have to be equal to each other insofar as pin 35 can be inserted into hole section 48 and rib 40 and notch section 50 do not directly face each other.

Pin 35 may have a configuration in which ribs 40 are radially formed around a columnar shaft section main body section instead of rib 40 constituting pin 35.

Ribs 40 may be equally disposed in the circumferential direction or may be disposed at different intervals.

INDUSTRIAL APPLICABILITY

The present invention can be applied to, for example, emblems attached to cover bodies for airbag apparatuses provided for handles and other parts of various moving bodies or other members as well as the cover body for the airbag apparatus used for the automobile handle (steering wheel).

REFERENCE SIGNS LIST

12 Airbag apparatus
18 Cover body
19 Cover main body section as attached section
20 Emblem as decoration member
28 Opening section
31 Emblem body as design section
32 Back plate as receiving section
35 Pin as engagement section
37 Shaft section
38 Enlargement section
40 Rib
48 Hole section
49 Elastic piece section as abutting section

What is claimed is:

1. A decoration member, comprising:
a design section, and
a receiving section,
wherein:
    the decoration member is attached by sandwiching an attached section with the design section and the receiving section,
    the design section includes at least one engagement section each inserted through an opening section formed in the attached section, each of the at least one engagement section has a shaft section provided with at least one rib and an enlargement section formed to be enlarged on a distal end side of the shaft section,
    the receiving section includes at least one hole section into which the engagement section is inserted and at least one abutting section formed at an inner edge of the hole section, elastically deformable in an insertion/removal direction of the engagement section with respect to the hole section, and abutting against the rib of the shaft section,
    three ribs are radially disposed in the shaft section, and
    three abutting sections are formed as the at least one abutting section and abut against the respective ribs in middle sections thereof.

2. A cover body for an airbag apparatus, provided with an airbag which is inflated and deployed as a result of introduction of gas from a folded state, the cover body comprising:
    a cover main body section as an attached section which covers the airbag in the folded state, tear opens as a result of inflation and deployment of the airbag, and has at least one opening section formed therein,
    the decoration member according to claim 1, and
    the shaft section is provided with three ribs in a radial shape, one of the ribs is disposed along a centrifugal force direction at a time of the tear opening of the cover main body section, and the other two ribs are disposed on both sides of the centrifugal force direction side with respect to the one rib.

* * * * *